US007832724B2

(12) United States Patent
Lo et al.

(10) Patent No.: US 7,832,724 B2
(45) Date of Patent: Nov. 16, 2010

(54) SHEET EJECTION MECHANISM AND DUPLEX SHEET FEEDING SYSTEM HAVING THE SGEEET EJECTION MECHANISM

(75) Inventors: Wen-Chung Lo, Hsinchu (TW); Ming-Hung Hsu, Hsinchu (TW); Jui-Pin Jao, Miaoli County (TW)

(73) Assignees: Silitek Electronic (Guangzhou) Co., Ltd., Guangzhou (CN); Lite-On Technology Corp., Taipei (TW)

( * ) Notice: Subject to any disclaimer, the term of this patent is extended or adjusted under 35 U.S.C. 154(b) by 0 days.

(21) Appl. No.: 12/237,395

(22) Filed: Sep. 25, 2008

(65) Prior Publication Data
US 2009/0289413 A1 Nov. 26, 2009

(30) Foreign Application Priority Data
May 22, 2008 (CN) .................. 2008 1 0028313

(51) Int. Cl.
*B65H 29/00* (2006.01)
(52) U.S. Cl. ..................... 271/186; 271/184; 271/65
(58) Field of Classification Search ......... 271/184–186, 271/314, 272, 65
See application file for complete search history.

(56) References Cited

U.S. PATENT DOCUMENTS

| 3,944,212 A * | 3/1976 | Stange et al. .................. 271/65 |
| 6,419,222 B1 * | 7/2002 | Morrison et al. ............. 271/186 |
| 7,360,636 B2 * | 4/2008 | Theriault ..................... 198/403 |
| 7,533,882 B2 * | 5/2009 | Song ........................... 271/186 |
| 2005/0194731 A1 * | 9/2005 | Ohama et al. ............. 271/10.11 |
| 2007/0045945 A1 * | 3/2007 | Iwago ......................... 271/272 |

\* cited by examiner

*Primary Examiner*—Kaitlin S Joerger
(74) *Attorney, Agent, or Firm*—Kile Goekjian Reed & McManus PLLC

(57) ABSTRACT

A sheet ejection mechanism including a sheet ejection roller capable of rotating along a selective direction and having an arc portion and a plane portion, the arc portion and the plane portion forming a D-shape cross-section, and a pinch member configured at a position adjacent to the sheet ejection roller, wherein a recording medium is clamped and conveyed between the pinch member and the arc portion of the sheet ejection roller, and a gap is formed between the plane portion and the pinch member for allowing the recording medium to pass. Also, the present invention provides a duplex sheet feeding system having the sheet ejection mechanism.

20 Claims, 16 Drawing Sheets

SHEET EJECTION MECHANISM AND DUPLEX SHEET FEEDING SYSTEM HAVING THE SGEEET EJECTION MECHANISM

BACKGROUND OF THE INVENTION

1. Field of the Invention

The invention relates to a sheet ejection mechanism and a sheet feeding system, and more particularly, to a sheet ejection mechanism in a duplex sheet feeding system and the duplex sheet feeding system.

2. Description of the Prior Art

In general, overlap of feeding edge and trailing edge of a recording medium occurs in a gap between two sheet ejection rollers. Such overlap may easily stop and jam the recording medium during conveying and lower the quality of printing or scanning.

Please refer to FIG. 1A. The U.S. Pat. No. 6,307,614 B1 discloses a method for scanning the recording medium. When the recording medium is scanned with duplex scanning, the feeding edge can not enter the gap formed between a roller 52 and a roller 54, because of the direction of rotation of the two rollers 52, 54, and the recording medium is buckled in front of the gap. Please refer to FIG. 1B. The thrust of the feeding edge of the recording medium overcomes the friction between the recording medium and the rollers so that the rollers 52, 54 are driven to rotate along an opposite direction and convey the recording medium into the gap between the rollers 52, 54.

Such type of design, however, causes problem as follow:

The system reduces its amount of recording medium ejection because the feeding edge of the recording medium, which has done its second side imaging, stops for a while before entering the gap between the two rollers.

In general, the used surface of the recording medium is not smoothly and for the recording medium to enter two tightly adjacent rollers, jamming easily occurs. The recording medium buckles and the quality of output degrades when the recording medium enters the gap formed between two rollers 52, 54.

The upper part of the recording medium and the lower part of the recording medium feed along opposite direction when the recording medium enters the gap formed between two rollers 52, 54. Additionally, the upper part of the recording medium also feeds along opposite direction to the rotation direction of the sheet ejection roller. The upper part of the recording medium has therefore been pulled, which increases overall system torque. The upper part of the recording medium may also be damaged by the pulling force.

To solve the problem mentioned above, please refer to FIG. 1C. The U.S. Pat. No. 6,493,060 B2 discloses a movable driven roller in the sheet ejection mechanism. The gap is formed between two rollers using high power solenoid for overcoming the elasticity of the driven roller before the feeding edge of the recording medium goes to the roller 62 for scanning. The feeding edge of the recording medium can then pass the rollers more smoothly. Such mechanism design, however, uses expensive high power solenoid and needs an additional promotional mechanism for moving the driven roller.

Additionally, the surface of the recording medium produces the mark of the roller engaging by the force of the roller contact. For this reason, the original recording medium is broken by the mark.

SUMMARY OF THE INVENTION

The present invention provides a sheet ejection mechanism. The sheet ejection mechanism includes a sheet ejection roller and a pinch member. The sheet ejection roller is capable of rotating along a selective direction and having an arc portion and a plane portion. The arc portion and the plane portion form a D-shape cross-section. The pinch member is configured at a position adjacent to the sheet ejection roller. A recording medium is clamped and conveyed between the pinch member and the arc portion of the sheet ejection roller, and a gap is formed between the plane portion and the pinch member for allowing the recording medium to pass.

The present invention provides a duplex sheet feeding system. The duplex sheet feeding system includes a feed roller, a conveying roller, a returning roller and a sheet ejection mechanism. The sheet ejection mechanism includes a sheet ejection roller and a pinch member. The feed roller conveys a recording medium from a feeding path into a scanning zone and being scanned by a scanning module. The conveying roller conveys the recording medium out of the scanning zone and into an ejecting path. The returning roller returns the recording medium conveyed out of the scanning zone back into the scanning zone through a returning path. The sheet ejection mechanism is the recording medium entering through the ejecting path. The sheet ejection mechanism includes a sheet ejection roller and a pinch member. The sheet ejection roller is capable of rotating along a selective direction and having an arc portion and a plane portion. The arc portion and the plane portion form a D-shape cross-section. The pinch member is configured at a position adjacent to the sheet ejection roller. The recording medium is clamped and conveyed outward between the pinch member and the arc portion when the sheet ejection roller rotates along a main direction. The recording medium is clamped and conveyed between the pinch member and the arc portion for being conveyed back into the returning path for being scanned when the sheet ejection roller rotates along an opposite direction. The gap is formed between the plane portion and the pinch member for allowing the recording medium to pass.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
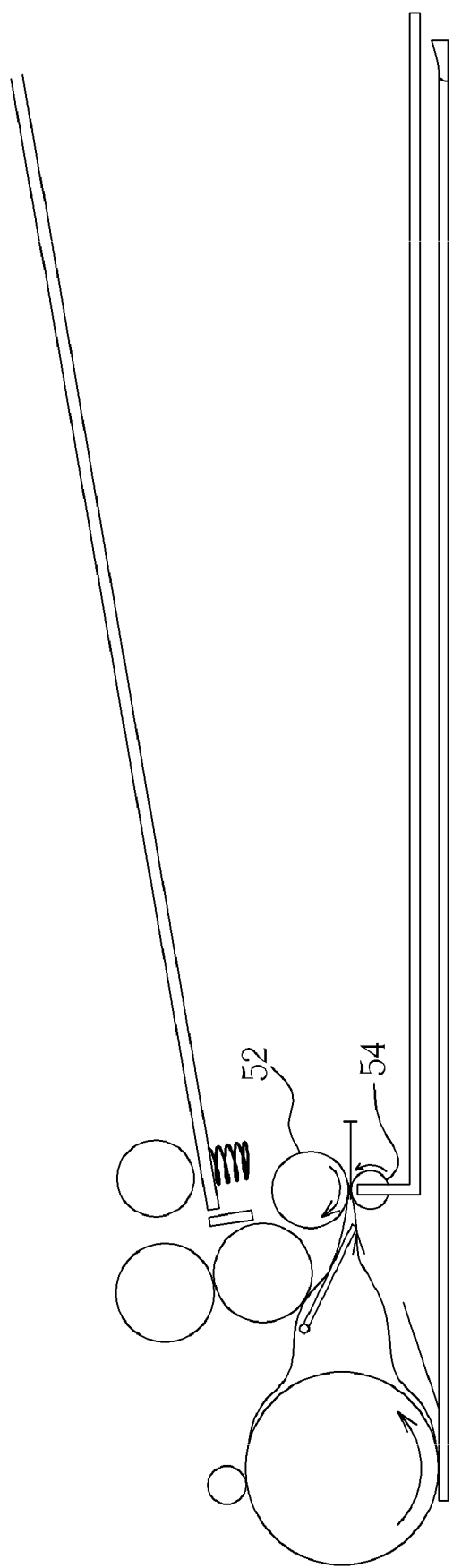
FIG. 1A~FIG. 1C are schematic diagrams of the prior art.
Figure 1B:
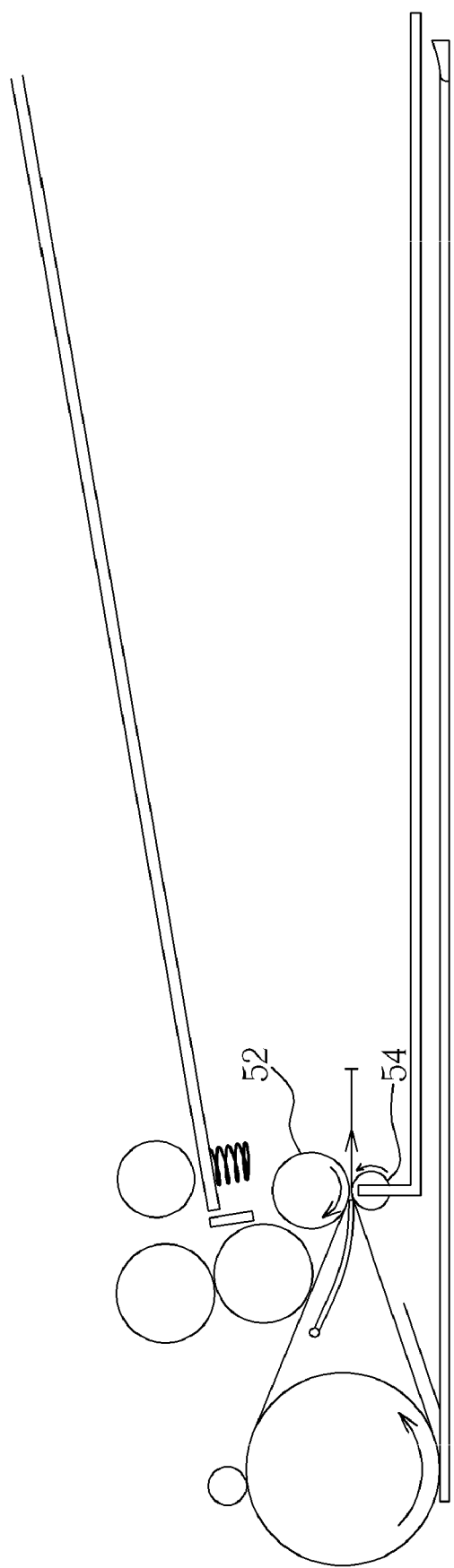
Figure 1C:
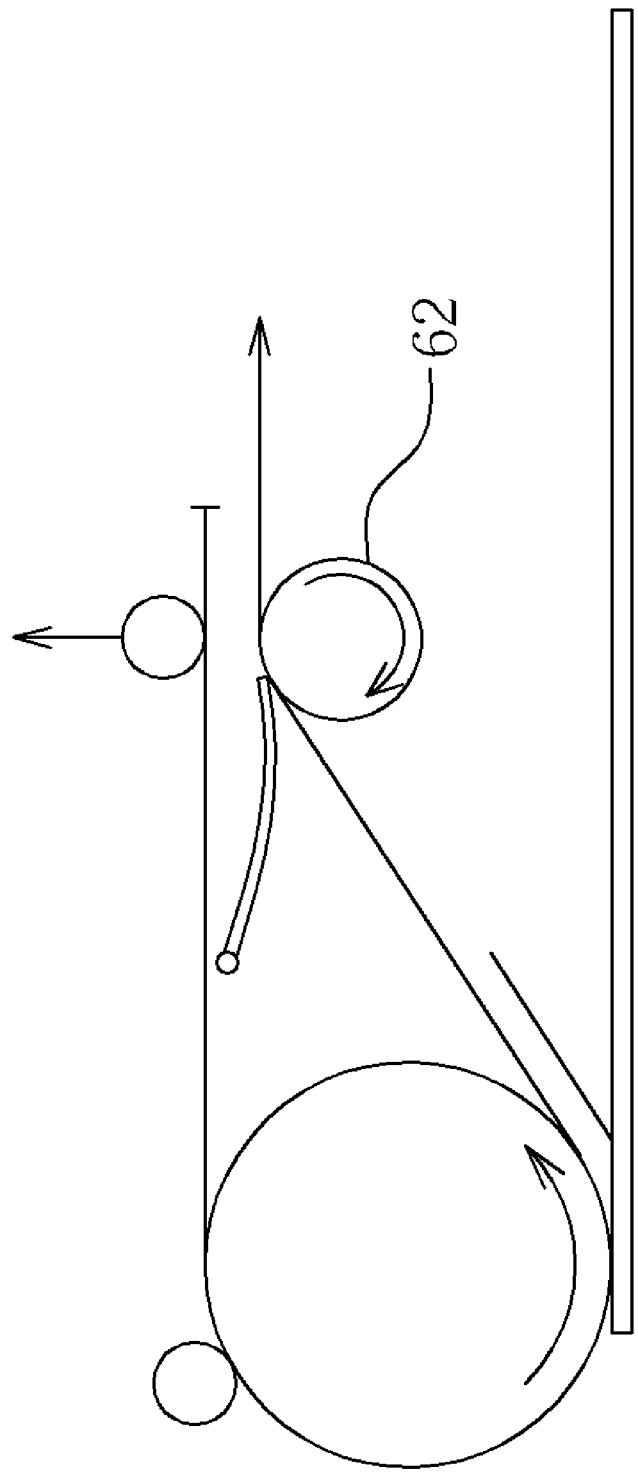
Figure 2:
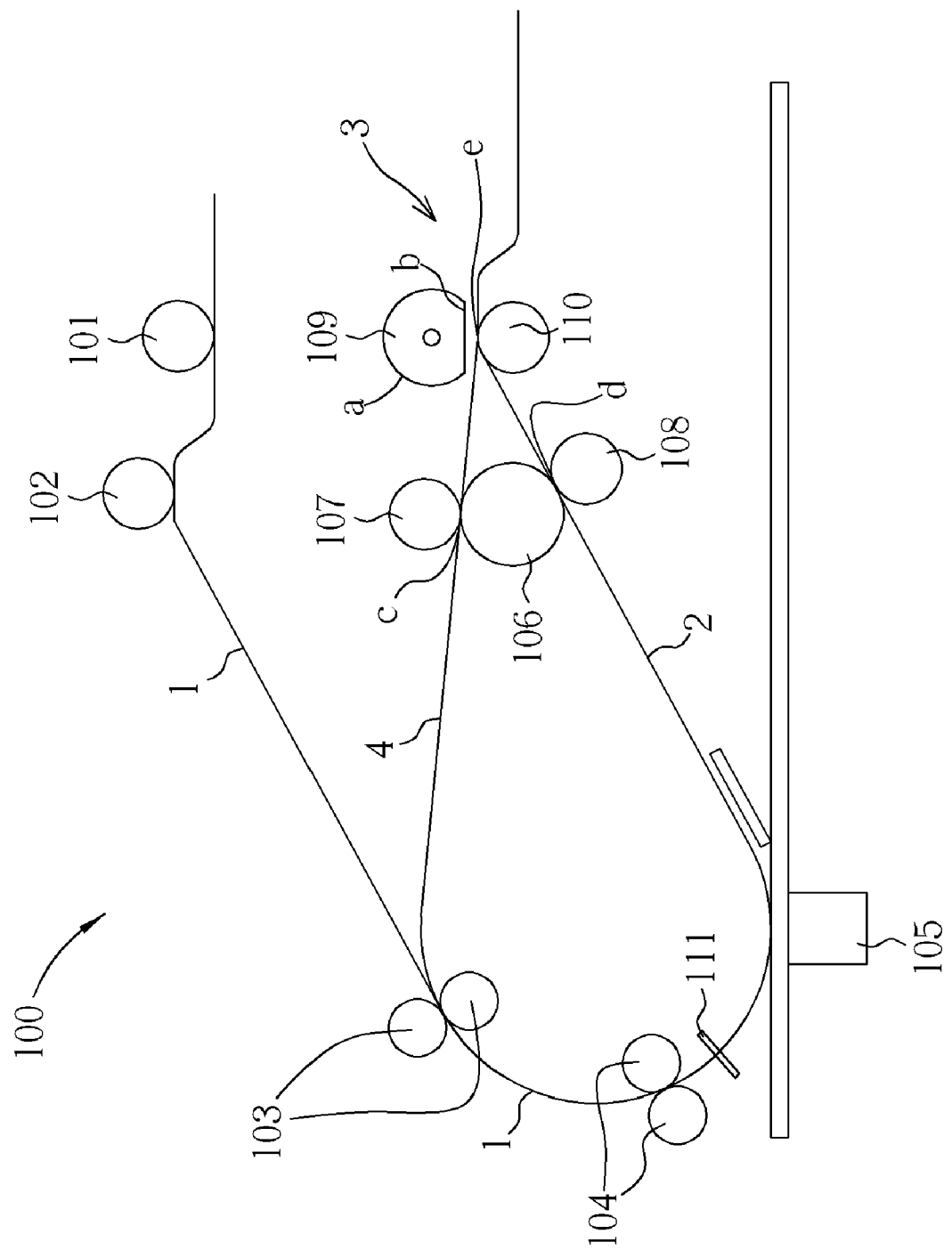
FIG. 2 is a schematic diagram of a first embodiment according to the present invention.

Please refer to FIG. 2. FIG. 2 is a schematic diagram of the first embodiment according to the present invention. A duplex sheet feeding system 100 disclosed in the embodiment includes a feeding path 1 and an ejecting path 2. A scanning unit module 105 is configured between the feeding path 1 and the ejecting path 2. A sheet ejection mechanism 3 is located at the end of the ejecting path 2. The end of a returning path 4 connects to the sheet ejection mechanism 3, and the other end connects to the feeding path 1. A pickup roller 101, a separation roller 102, a first feed roller 103, and a second feed roller 104 locate in the feeding path 1. The scanning unit module 105 is located after the second feed roller 104 in the feeding path 1. A conveying roller 108 is configured in the ejecting path 2 and is a driven roller. A returning roller 107 is configured in the returning path 4 and is also a driven roller. An intermediate roller 106 engages with the conveying roller 108 and the returning roller 107. The intermediate roller 106 is a driving roller which engages with the conveying roller 108 for conveying the recording medium out of the scanning zone. The intermediate roller 106 engages with the returning roller 107 for returning the recording medium back the returning path 4 into the feeding path 1 and the scanning zone for scanning. The intermediate roller 106 can be a single roller or two independent driving rollers for engaging the conveying roller 108 and the returning roller 107 respectively. For this and other embodiment, single-roller form of the intermediate roller 106 reduces the number of transmission shaft and simplifies the flow paths of the sheet feeding system.

A sheet ejection roller 109 is configured in the end of the ejecting path 2 and is a driving roller. A pinch member 110 engages with the sheet ejection roller 109 and is also a sheet ejection driven roller of the present invention. The sheet ejection roller 109 has an arc portion A and a plane portion B, which form a D-shape cross-section. A sensor 111 is configured between the second feed roller 104 and the scanning unit module 105. Additionally, the sheet ejection roller 109 is controlled by a low power motor or an actuator, and its rotation can be detected by a sensor. The technology of the low power motor or the simple brake has been obvious to a person having ordinary skill, and it is omitted herein for brevity.

Figure 3A:
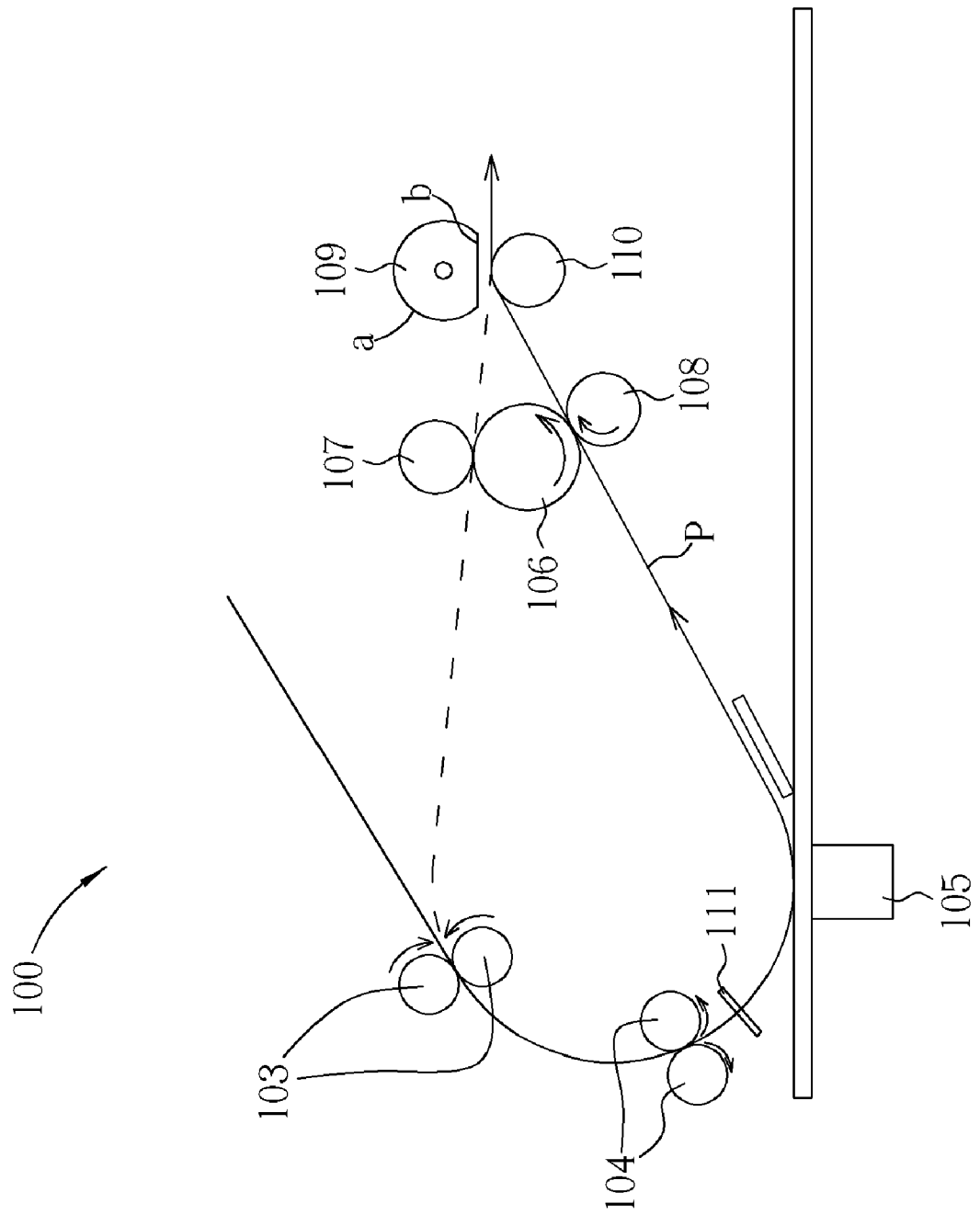
FIG. 3A~FIG. 3C are schematic diagrams of a single sheet feeding path of the first embodiment according to the present invention.

Please refer to FIG. 3A. A pickup roller 101 picks the recording medium P from an input tray (not shown) and the feeding roller 102 conveys the recording medium P. The recording medium P is conveyed by the first feed roller 103 and the second feed roller 104 through the scanning zone for generating the picture by the scanning unit module 105. The recording medium P is clamped in the gap formed between the intermediate roller 106 and the conveying roller 108 and then conveyed into between the sheet ejection roller 109 and the pinch member 110, where the gap formed between therein (the plane portion B of the sheet ejection roller 109 and the pinch member 110) allows the feeding edge of the recording medium P to pass and not be stopped.

Figure 3B:
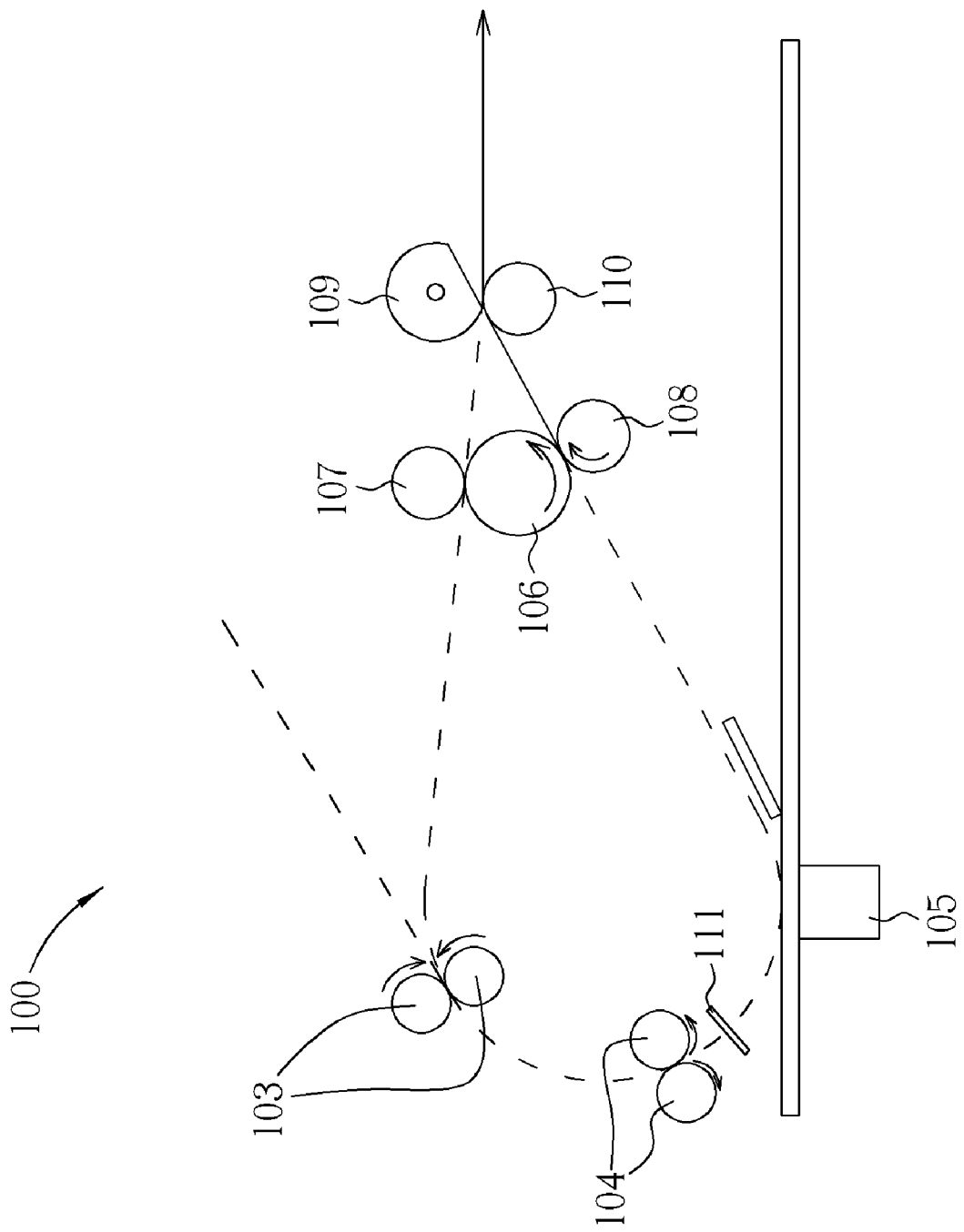

Please refer to FIG. 3B. The sheet ejection roller 109 begins to rotate counterclockwise after a predetermined time set by the system when the end of the recording medium P leaves the sensor 111. The arc portion A of the sheet ejection roller 109 contacts the recording medium P and forms a clipping gap with the pinch member 110 for conveying the recording medium P before the trailing edge of the recording medium P leaves the gap formed by the intermediate roller 106 and the conveying roller 108. For the following description, rotation of any roller along counterclockwise direction is recognized as forward rotation in the present invention.

The length of the arc portion of the sheet ejection roller 109 is larger than the distance between the gap D formed between the conveying roller 108 and the intermediate roller 106 and the gap E formed between the sheet ejection roller 109 and the pinch member 110 such that conveying the recording medium P between the sheet ejection roller 109 and the pinch member 110 can be smooth.

Figure 3C:
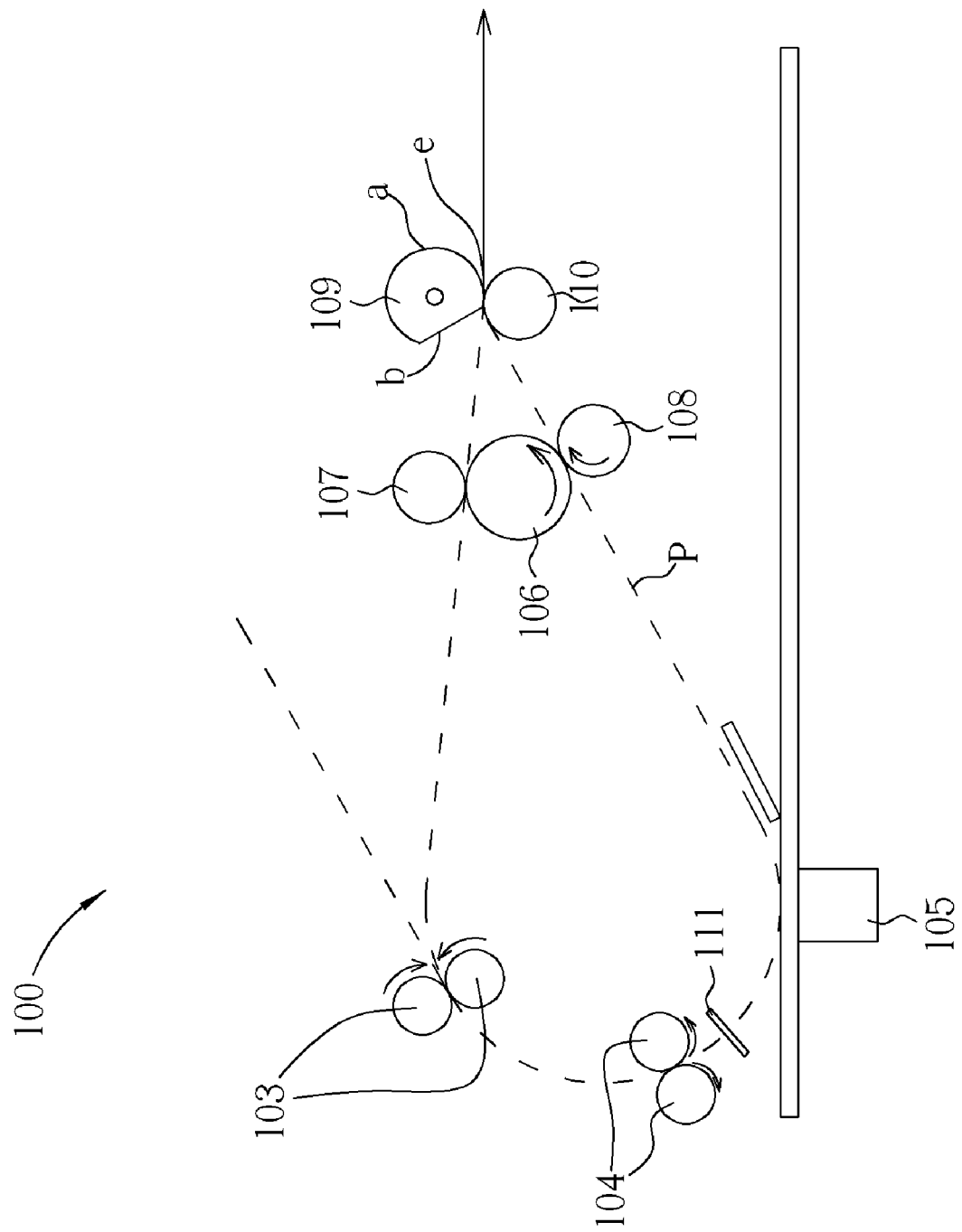

Please refer to FIG. 3C. The recording medium P is ejected to the output tray by the sheet ejection roller 109 and the pinch member 110.

Figure 4A:
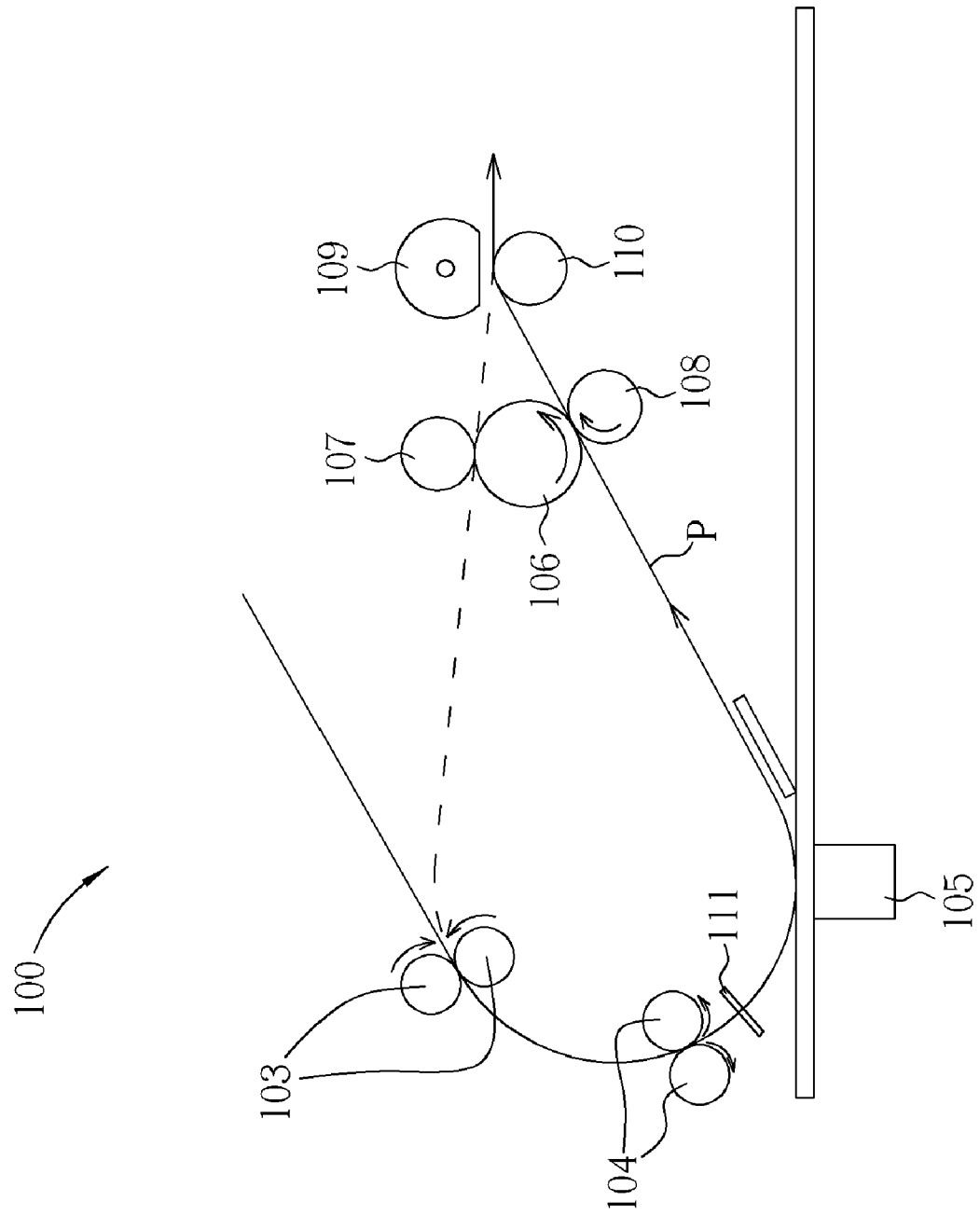
FIG. 4A~FIG. 4F are schematic diagrams of a duplex sheet feeding path of the first embodiment according to the present invention.

Please refer to FIG. 4A. The pickup roller 101 picks the recording medium P from the input tray (not shown), and the feeding roller 102 conveys the recording medium P picked by the pickup roller 101. The recording medium P is fed by the first feed roller 103 and the second feed roller 104 and then passed through the scanning zone for the scanning unit module 105 to generate the picture on it. The recording medium P is clamped by the gap formed between the intermediate roller 106 and the conveying roller 108, and the recording medium P is conveyed between the sheet ejection roller 109 and the pinch member 110. Since the gap is formed between the plane B of the D-shape sheet ejection roller 109 and the pinch member 110, the feeding edge of the recording medium P encounters no resistance when the recording medium P passes through the gap between the sheet ejection roller 109 and the pinch member 110.

Figure 4B:
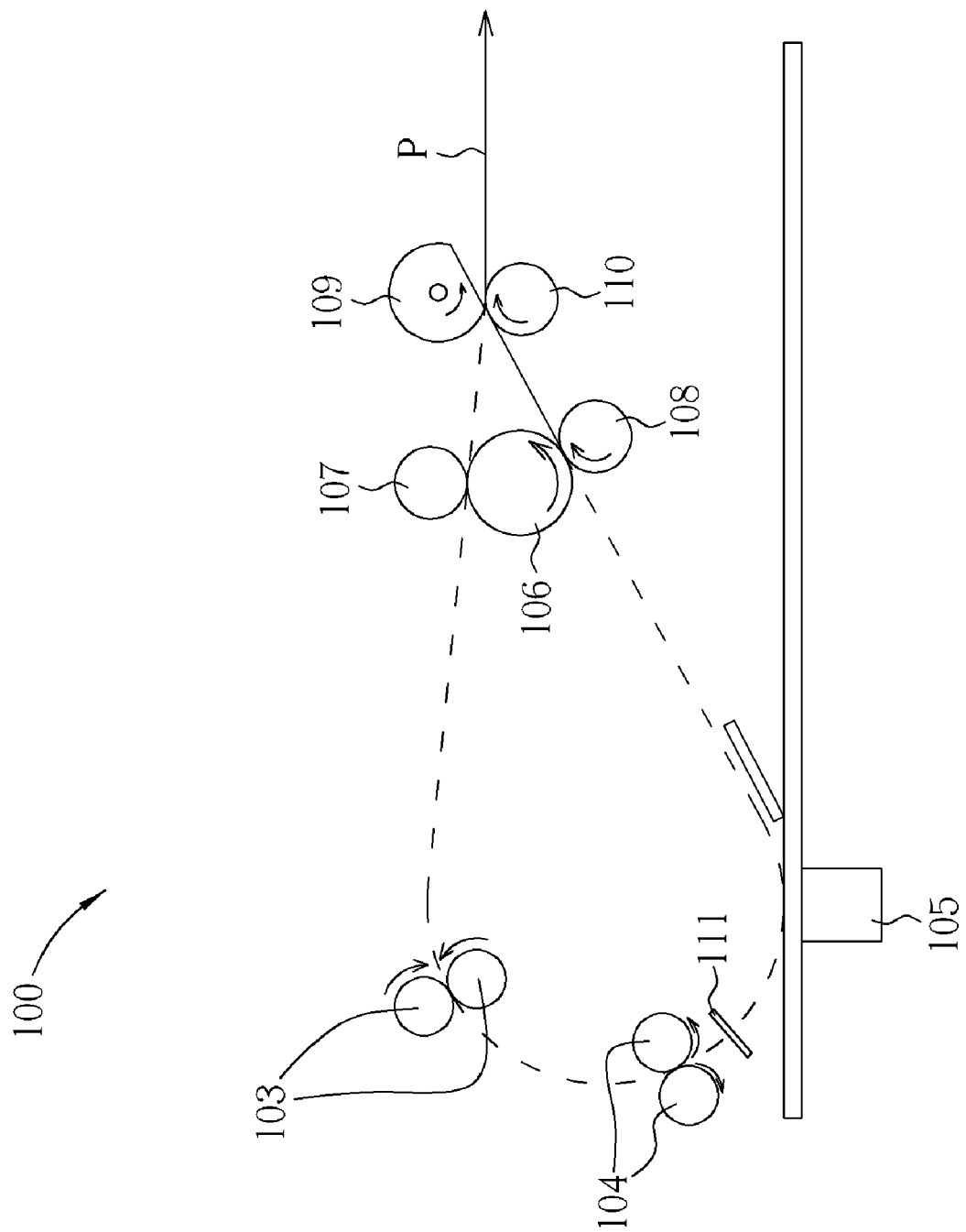

Please refer to FIG. 4B. The sheet ejection roller 109 begins to rotate counterclockwise after a predetermined time set by the system when the end of the recording medium P leaves the sensor 111. The arc portion A of the sheet ejection roller 109 contacts the recording medium P and forms a clipping gap with the pinch member 110 for conveying the recording medium P before the trailing edge of the recording medium P leaves the gap formed by the intermediate roller 106 and the conveying roller 108. For the following description, rotation of any roller along counterclockwise direction is recognized as forward rotation in the present invention.

The length of the arc portion A of the sheet ejection roller 109 is larger than the distance between the gap D formed between the conveying roller 108 and the intermediate roller 106 and the gap E formed between the sheet ejection roller 109 and the pinch member 110 such that conveying the recording medium P between the sheet ejection roller 109 and the pinch member 110 can be smooth.

Figure 4C:
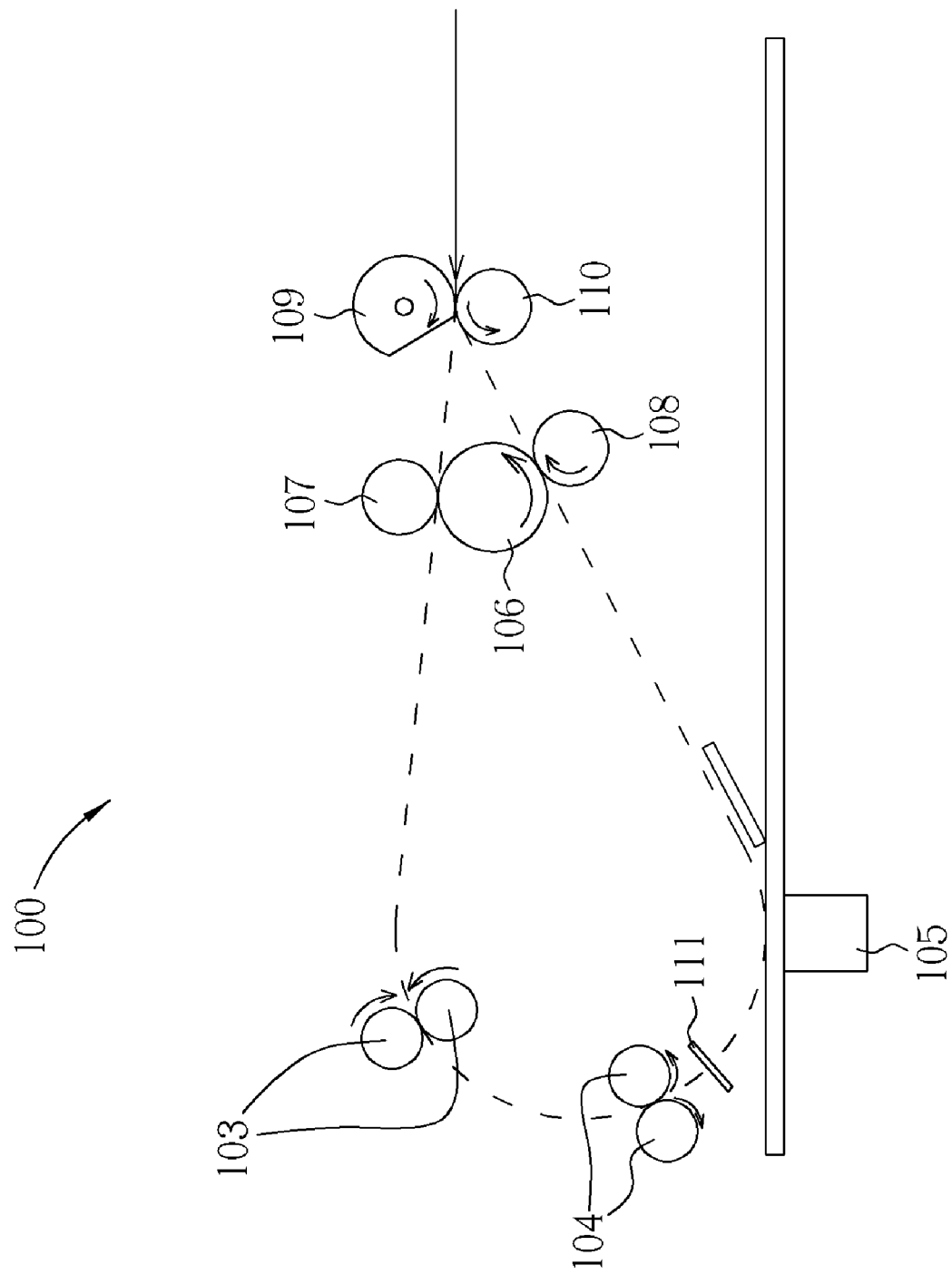

Please refer to FIG. 4C. The sheet ejection roller 109 begins to rotate clockwise before the railing edge of the recording medium P leaves the sheet ejection roller 109 and the pinch member 110 after the predetermined time set by the system. The original trailing edge of the recording medium P turns into feeding edge of the recording medium P and goes along the second feeding path for forming picture on the second side.

The length of the arc portion A of the sheet ejection roller 109 is larger than the distance between the gap C formed between the returning roller 107 and the intermediate roller 106 and the gap E formed between the sheet ejection roller 109 and the pinch member 110 such that conveying the recording medium P from the sheet ejection roller 109 and the pinch member 110 to the gap C formed between the returning roller 107 and the intermediate roller 106 can be smooth.

Figure 4D:
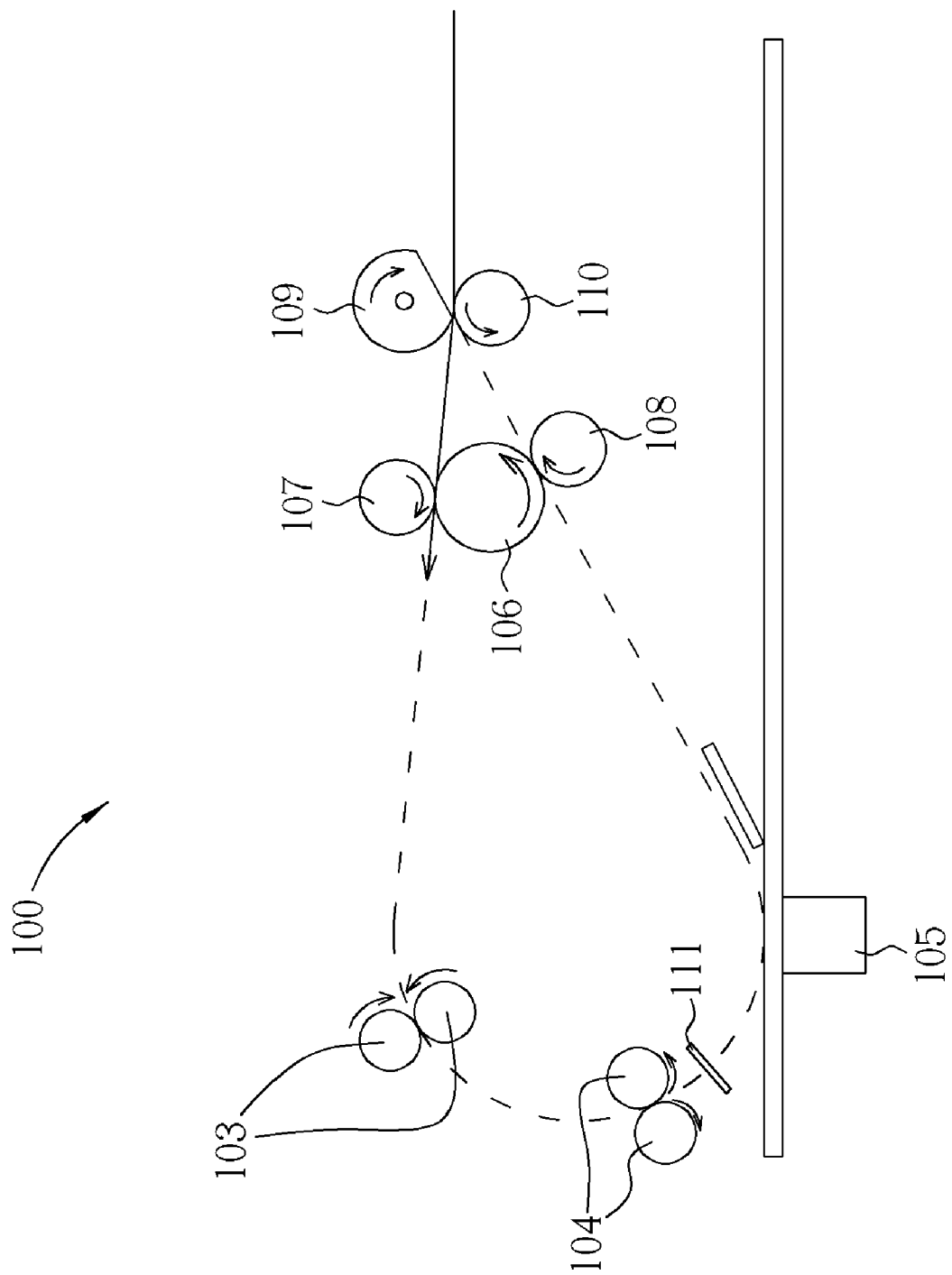

Please refer to FIG. 4D. The feeding edge of the recording medium P is clamped and conveyed by the gap formed between the intermediate roller 106 and the returning roller 107 at the same time the sheet ejection roller 109 keeps to rotate clockwise for returning the recording medium P back with the pinch member 110. The sheet ejection roller 109 stops rotating once the plane B of the sheet ejection roller 109 and the pinch member 110 form the gap.

Figure 4E:
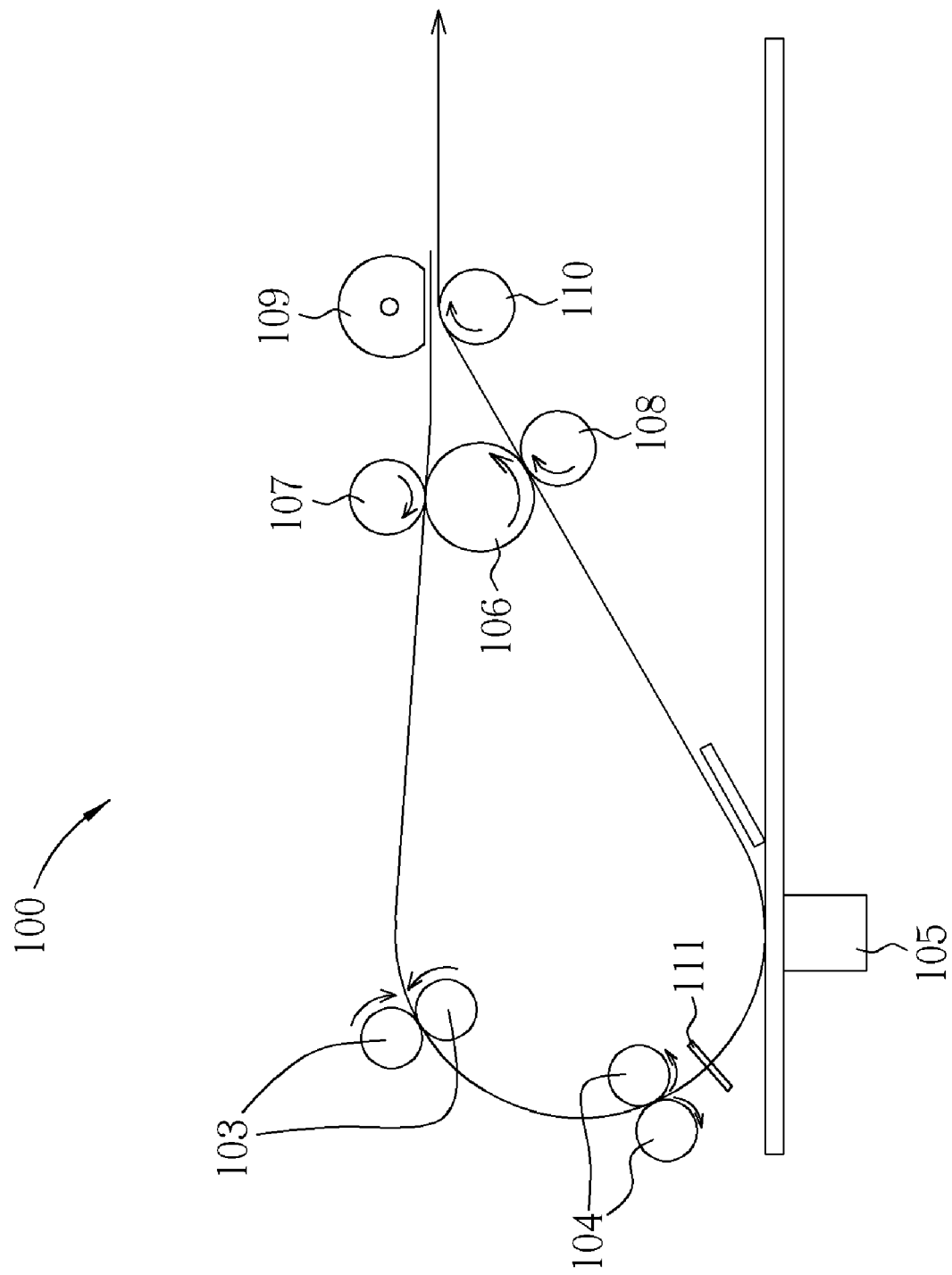

Please refer to FIG. 4E. The recording medium P is clamped and fed in the gap formed between the intermediate roller 106 and the returning roller 107 along the returning path 4 and then clamped and fed in the gap formed between the first feed roller 103 and the second feed roller 104. The feeding edge of the recording medium P passes through the scanning unit module 105 via the gap formed between the intermediate roller 106 and the conveying roller 108 and goes into the gap formed between the sheet ejection roller 109 and the pinch member 110. The recording medium P overlaps in the group of the sheet ejection rollers (The group of the sheet ejection roller includes the sheet ejection roller 109 and the pinch member 110.) if longer recording medium P is used. In such condition, the recording medium P will not buckle because the gap is formed between the group of the sheet ejection rollers of the present invention.

Figure 4F:
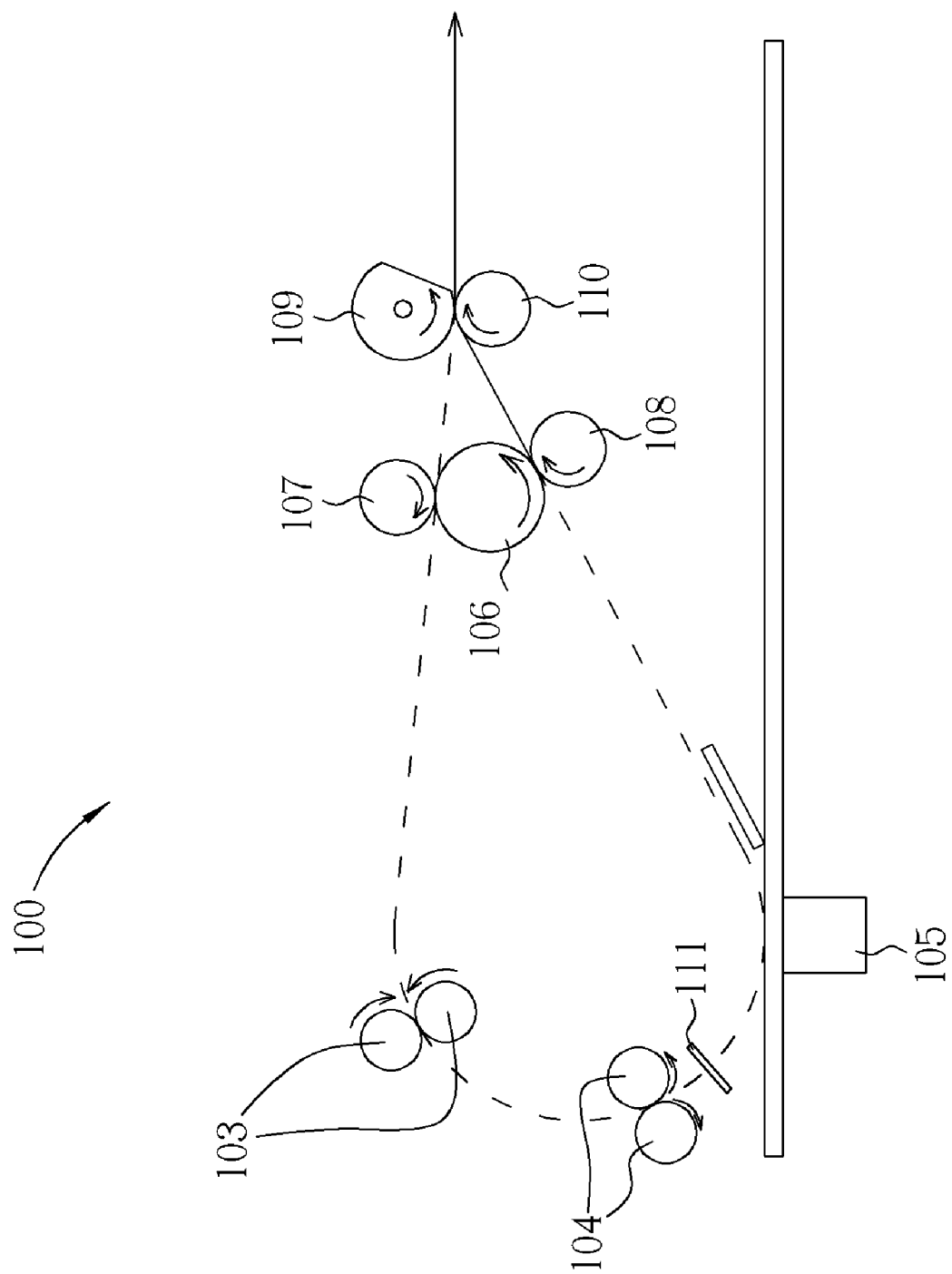

Please refer to FIG. 4F. The trailing edge of the recording medium P leaves the sensor 111 after the feeding edge of the recording medium P enters into the output tray (not shown). The sheet ejection roller 109 begins to rotate counterclockwise after the predetermined time set by the system. The arc portion A of the sheet ejection roller 109 contacts with the recording medium P and then forms the gap with the driven roller 110 before the trailing edge of the recording medium P leaves the gap formed between two feed rollers 104. The recording medium P is conveyed to the output tray through the gap formed between the sheet ejection roller 109 and the driven roller 110. The recording medium P is finally ejected and overlapped to the output tray.

It should be noted again that when the intermediate roller 106 is replaced with two independent driving rollers, the length of the arc portion A of the sheet ejection roller 109 is larger than the distance between the gap formed between the returning roller 107 and the driving roller that engages with the returning roller 107 and the gap E formed between the sheet ejection roller 109 and the pinch member 110. The length of the arc portion A of the sheet ejection roller 109 is also larger than the distance between the gap formed between the conveying roller 108 and the driving roller that engages with the conveying roller 108 and the gap E formed between the sheet ejection roller 109 and the pinch member 110.

Figure 5:
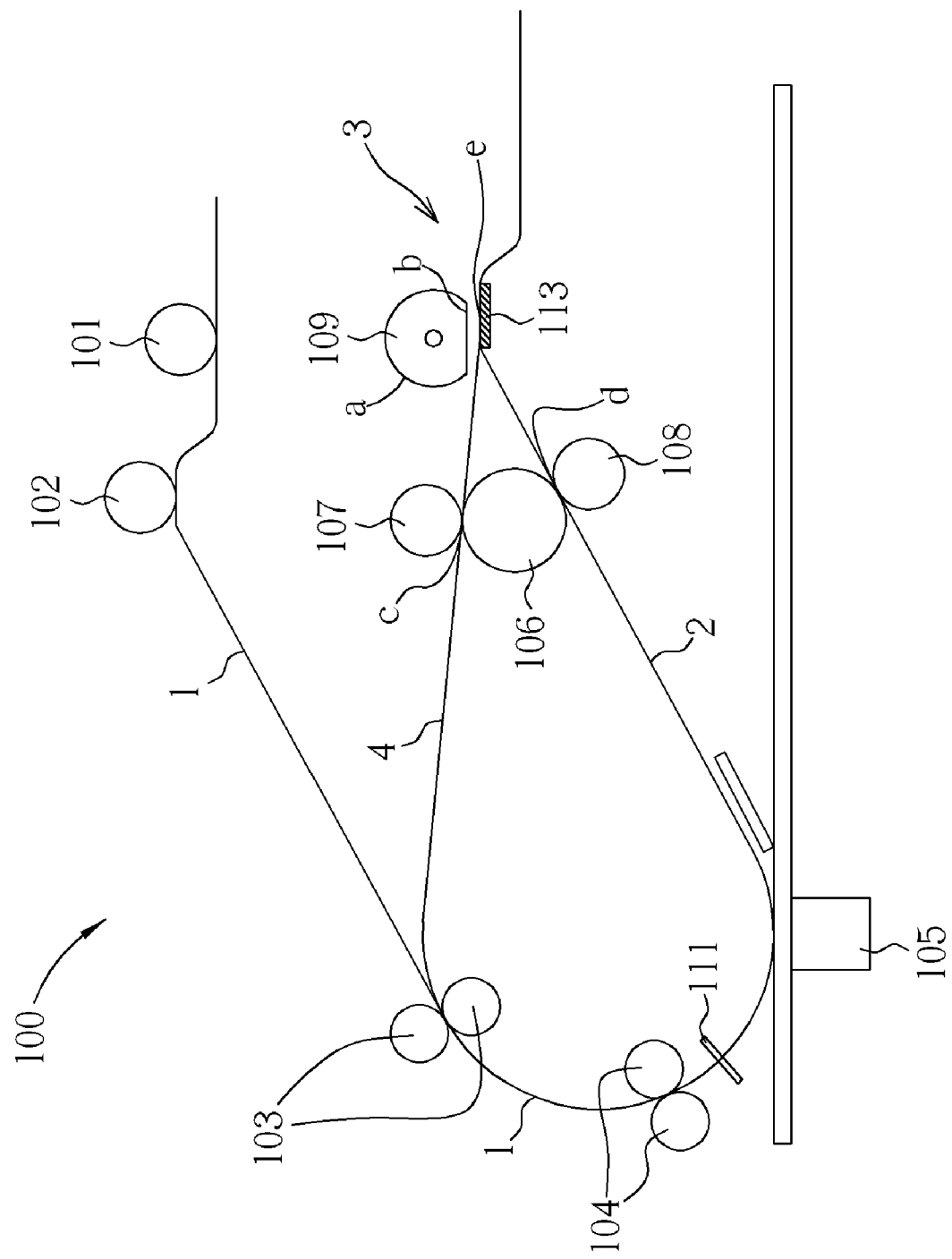
FIG. 5 is a schematic diagram of a second embodiment according to the present invention.

Please refer to FIG. 5. FIG. 5 is a schematic diagram of the second embodiment according to the present invention. The second embodiment and the first embodiment use substantially the same way to convey the recording medium P except that the sheet ejection roller 109 engages with a plate 113 in the second embodiment. The friction coefficient between the plate 113 and the recording medium P is smaller than that between the arc portion A of the sheet ejection roller 109 and the recording medium P so that conveying the recording medium P is attainable.

Figure 6:
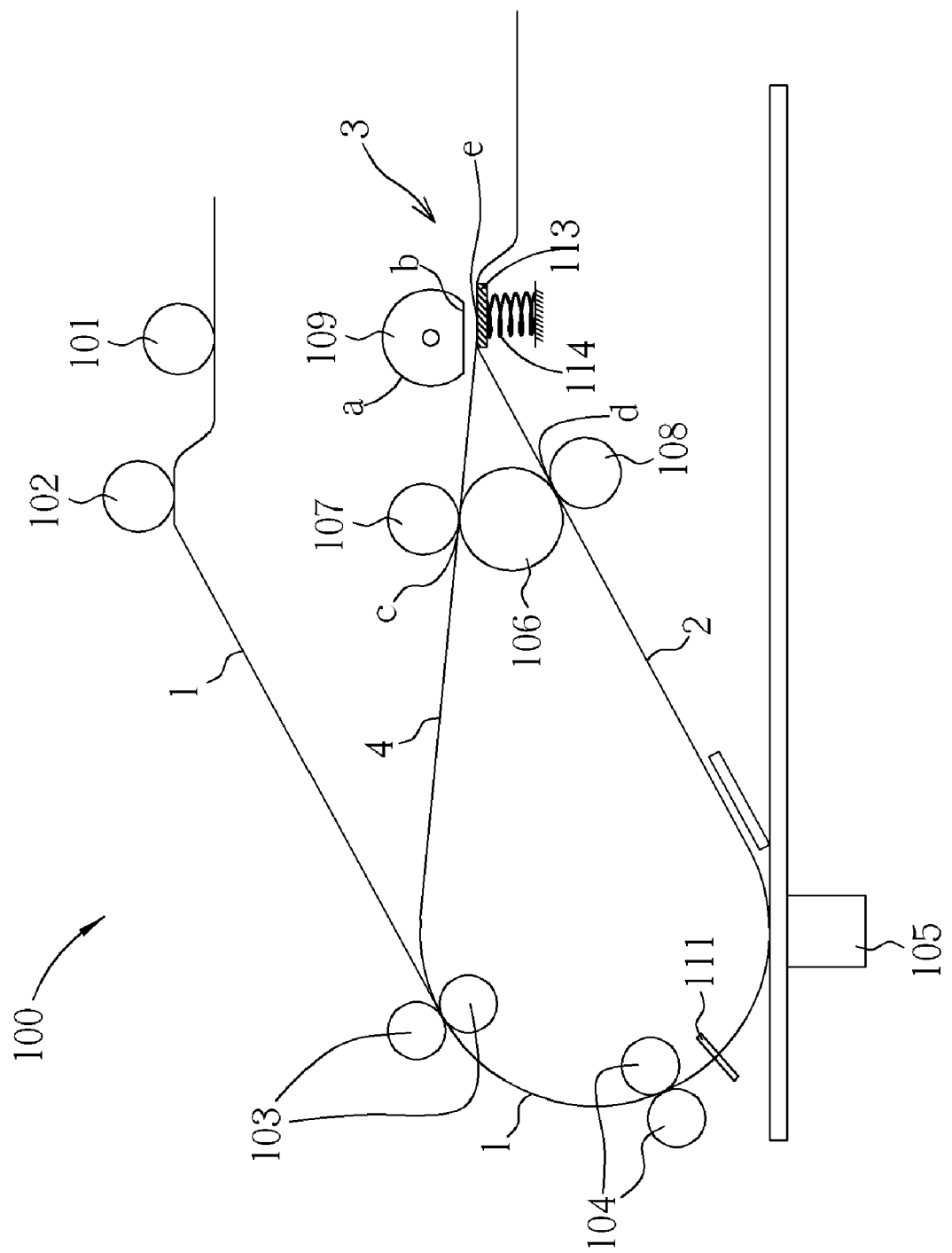
FIG. 6 is a schematic diagram of a third embodiment according to the present invention.

Please refer to FIG. 6. FIG. 6 is a schematic diagram of the third embodiment according to the present invention. The third embodiment and the first embodiment use substantially the same way to convey the recording medium P except that the sheet ejection roller 109 engages with the plate 113 and contacts with a spring 114 such that the plate 113 can recover to its height position automatically by elasticity of the spring 114. The friction coefficient between the plate 113 and the recording medium P is smaller than that between the arc portion A of the sheet ejection roller 109 and the recording medium P so that conveying the recording medium P is attainable.

It should be noted again that the recording media P is conveyed by the sheet ejection roller 109 in the second and the third embodiments.

Figure 7:
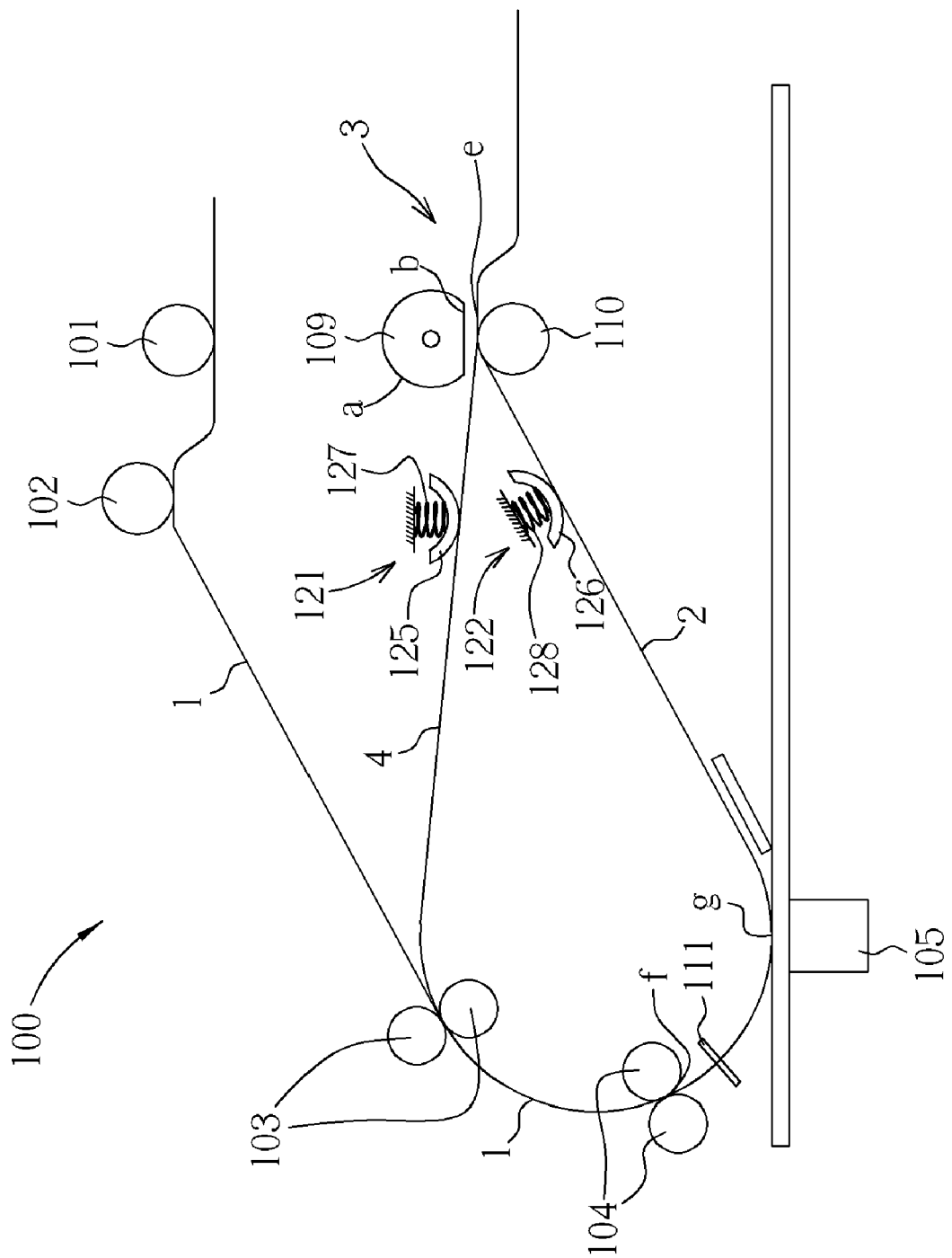
FIG. 7 is a schematic diagram of a fourth embodiment according to the present invention.

Please refer to FIG. 7. FIG. 7 is a schematic diagram of the fourth embodiment according to the present invention. The fourth embodiment and the first embodiment use substantially the same way to convey the recording medium P except that in the fourth embodiment, a first paper weight 121 replaces the intermediate roller 106 that engages with the returning roller 107 in the first embodiment, and a second paper weight 122 replaces the intermediate roller 106 that engages with the conveying roller 108 in the first embodiment. The first paper weight 121 is configured in the returning path 4 and the second paper weight 122 is configured in the ejecting path 2. Additionally, the sensor 111 is installed between the first feed roller 103 and the second feed roller 104. The sensor 111 is located at an entering position of the scanning unit module 105. The first paper weight 121 includes a first arc plate 125 and a first paper weight spring 127. The first paper weight spring 127 connects with the first arc plate 125 and is installed on the housing of the sheet ejection system 100. The second paper weight 122 includes a second arc plate 126 and a second paper weight spring 128. The second paper weight spring 128 connects with the second arc plate 128 and is installed on the housing of the sheet ejection system 100 (not shown).

The second paper weight 122 of the sheet feeding system 100 prevents that the recording medium P buckles when the recording medium P has done its first side imaging in the single sheet feeding process. The first paper weight 121 of the sheet feeding system 100 prevents that the recording medium P buckles when the recording medium P has done its second side imaging in the duplex sheet feeding process of the fourth embodiment.

When the trailing edge of the recording medium P enters the gap formed between two second feed rollers 104, the length of the arc portion A is larger than the distance between the gap F formed between two second feed rollers 104 and the scanning zone position G corresponding to the scanning unit module 105. The sheet ejection roller 109 and the pinch member 110 begin to rotate for clamping and conveying the feeding edge of the recording medium P.

The sheet ejection mechanism of the present invention compacts a duplex sheet feeding system and longer recording medium P is allowed to use smoothly. The recording medium P is paper, substrate, document or something for recording.

Those skilled in the art will readily observe that numerous modifications and alterations of the device and method may be made while retaining the teachings of the invention.

What is claimed is:

1. A duplex sheet feeding system, comprising:
   a feed roller for conveying a recording medium from a feeding path into a scanning zone and being scanned by a scanning module;
   a conveying roller for conveying the recording medium out of the scanning zone and into an ejecting path, wherein the ejecting path has a first end and a second end opposite to the first end, the first end of the ejecting path is connected to the feeding path;
   a returning roller for returning the recording medium conveyed out of the scanning zone back into the scanning zone through a returning path, wherein the returning path has a first end and a second end opposite to the first end, the first end of the returning path is connected to the feeding path;
   a paper weight configured at the returning path and the ejecting path; and
   a sheet ejection mechanism connected with the second end of the returning path and the second end of the ejecting path, the returning path and the ejecting path are located at the same side to the sheet ejection mechanism, the recording medium entering the sheet ejection mechanism through the ejecting path, the sheet ejection mechanism comprising:
      a sheet ejection roller capable of rotating along one of a first direction and a second direction opposite to the first direction and having an arc portion and a plane portion, the arc portion and the plane portion forming a D-shape cross-section; and a pinch member configured at a position adjacent to the sheet ejection roller;

wherein the recording medium is clamped and conveyed outward between the pinch member and the arc portion when the sheet ejection roller rotates along the first direction, and the recording medium is clamped and conveyed between the pinch member and the arc portion for being conveyed back into the returning path for being scanned when the sheet ejection roller rotates along the second direction, and a gap is formed between the plane portion and the pinch member for allowing the recording medium to pass.

2. The duplex sheet feeding system of claim 1, wherein the paper weight comprises an arc plate and a spring connecting to the arc plate.

3. The duplex sheet feeding system of claim 1, wherein the length of the arc portion is larger than the distance between the returning roller and the gap formed between the sheet ejection roller and the pinch member.

4. The duplex sheet feeding system of claim 1, wherein the length of the arc portion is larger than the distance between the conveying roller and the gap formed between the sheet ejection roller and the pinch member.

5. The duplex sheet feeding system of claim 1, wherein the pinch member is a driven roller.

6. The duplex sheet feeding system of claim 1, wherein the pinch member is a plate.

7. The duplex sheet feeding system of claim 6, wherein the plate connects to an elastic member for driving the plate to recover automatically.

8. The duplex sheet feeding system of claim 6, further comprising a sensor locating at an entering position of the scanning zone.

9. The duplex sheet feeding system of claim 6, wherein the friction coefficient between the plate and the recording medium is smaller than the friction coefficient between the arc portion and the recording medium.

10. The duplex sheet feeding system of claim 1, wherein the length of the arc portion is larger than the distance between the feed roller and a location where the scanning module locates in the scanning zone.

11. A duplex sheet feeding system, comprising:
a feed roller for conveying a recording medium from a feeding path into a scanning zone and being scanned by a scanning module;
a conveying roller for conveying the recording medium out of the scanning zone and into an ejecting path;
a returning roller for returning the recording medium conveyed out of the scanning zone back into the scanning zone through a returning path;
a paper weight configured at the returning path and the ejecting path; and
a sheet ejection mechanism where the recording medium entering through the ejecting path, the sheet ejection mechanism comprising:
a sheet ejection roller capable of rotating along one of a first direction and a second direction opposite to the first direction and having an arc portion and a plane portion, the arc portion and the plane portion forming a D-shape cross-section; and
a pinch member configured at a position adjacent to the sheet ejection roller;
wherein the recording medium is clamped and conveyed outward between the pinch member and the arc portion when the sheet ejection roller rotates along the first direction and the recording medium is clamped and conveyed between the pinch member and the arc portion for being conveyed back into the returning path for being scanned when the sheet ejection roller rotates along the second direction, and a gap is formed between the plane portion and the pinch member for allowing the recording medium to pass.

12. The duplex sheet feeding system of claim 11, wherein the paper weight comprises an arc plate and a spring connecting to the arc plate.

13. The duplex sheet feeding system of claim 11, wherein the length of the arc portion is larger than the distance between the returning roller and the gap formed between the sheet ejection roller and the pinch member.

14. The duplex sheet feeding system of claim 11, wherein the length of the arc portion is larger than the distance between the conveying roller and the gap formed between the sheet ejection roller and the pinch member.

15. The duplex sheet feeding system of claim 11, wherein the pinch member is a driven roller.

16. The duplex sheet feeding system of claim 11, wherein the pinch member is a plate.

17. The duplex sheet feeding system of claim 16, wherein the plate connects to an elastic member for driving the plate to recover automatically.

18. The duplex sheet feeding system of claim 16, further comprising a sensor locating at an entering position of the scanning zone.

19. The duplex sheet feeding system of claim 15, wherein the friction coefficient between the plate and the recording medium is smaller than the friction coefficient between the arc portion and the recording medium.

20. The duplex sheet feeding system of claim 11, wherein the length of the arc portion is larger than the distance between the feed roller and a location where the scanning module locates in the scanning zone.

* * * * *